United States Patent
Firey (10) Patent No.: US 6,295,965 B1
(45) Date of Patent: Oct. 2, 2001

(54) ENGINE CYLINDER STRATIFIER

(76) Inventor: Joseph Carl Firey, P.O. Box 15514, Seattle, WA (US) 98115-0514

(*) Notice: Subject to any disclaimer, the term of this patent is extended or adjusted under 35 U.S.C. 154(b) by 0 days.

(21) Appl. No.: 09/752,237

(22) Filed: Jan. 2, 2001

(51) Int. Cl.[7] .................................................. F02B 17/00
(52) U.S. Cl. .......................................... 123/250; 123/295
(58) Field of Search ............................... 123/250, 73 C, 123/294, 295, 298, 305, 429, 430, 445, 495, 504, 531

(56) References Cited

U.S. PATENT DOCUMENTS

| | | | |
|---|---|---|---|
| 5,456,232 | * 10/1995 | Firey | 123/430 |
| 5,899,188 | * 5/1999 | Firey | 123/250 |
| 5,899,195 | * 5/1999 | Firey | 123/531 |
| 5,931,123 | * 8/1999 | Firey | 123/25 C |
| 5,931,144 | * 8/1999 | Firey | 123/681 |
| 6,116,207 | * 9/2000 | Firey | 123/250 |

* cited by examiner

Primary Examiner—John Kwon

(57) ABSTRACT

Within a displaceable enclosed volume, appreciably smaller than the engine displacement volume, a fuel-rich air fuel mixture is prepared. Following the next engine intake process, this displacer mixture is pulsed into the engine cylinder to create a stratified air fuel mixture therein.

Subsequent combustion of this stratified engine air fuel mixture can be knock free, thus permitting the use of very high intake supercharge for small displacement, low speed, and thus high mechanical efficiency engines.

By placement of insulating, air only portions, of the stratified engine air fuel mixture, against the engine cylinder head and piston crown, cooling jacket heat loss can be reduced, and fuel efficiency increased. In these ways, large improvements in vehicle miles per gallon can be achieved.

20 Claims, 5 Drawing Sheets

ENGINE CYLINDER STRATIFIER

CROSS REFERENCES TO RELATED APPLICATIONS

This application is related to my earlier filed U.S. Patent application entitled "Intake Stratifier Apparatus," Ser. No. 09/617008, filed Jul. 14, 2000, GAU 3747. This application is also related to my issued U.S. Pat. No. 6,116,207, issued Sep. 12, 2000.

BACKGROUND OF THE INVENTION

1. Field of the Invention

This invention is in the fields of air fuel mixture stratifiers for internal combustion engines of the piston and cylinder type, wherein a stratified principal air fuel mixture can be created in the engine cylinder prior to or during compression.

2. Description of the Prior Art

The Hesselman engine combustion process, and the more recent Texaco combustion process, are examples of early prior art air fuel mixture stratifiers, which created a stratified principal air fuel mixture in the engine combustion chamber. Descriptions of examples of these prior art mixture stratifier schemes are presented in the following references:

(i) "A High Power Spark-Ignition Fuel Injection Engine," Trans. SAE, Vol. 35, p.431, 1934;

(ii) "The Elimination of Combustion Knock-Texaco Combustion Process," SAE Quarterly Trans., Vol. 5, p.26, 1951;

(iii) "The Elimination of Combustion Knock," E. Barber, J. Malin, J. Mikita, Jour, of the Franklin Institute, Vol. 241, p.275, April 1946;

In these prior art Texaco combustion processes, a jet of liquid fuel was injected in the engine combustion chamber, near the end of the compression stroke. The air inside the engine cylinder was set into rotary motion during intake, by use of shrouded intake valves, or specially oriented intake ports and manifolds. The liquid fuel spray was carried by the rotating air into which it was injected, toward a spark igniter. When this stratified air fuel mixture reached the spark, evaporated portions of the fuel, diffused into the surrounding air, were ignited by the spark, and a burning zone was thus created. The heat generated in this burning zone, evaporated those fuel portions unevaporated at the time of spark ignition and subsequent interdiffusion of air and thusly evaporated fuel maintained the burning zone, until most of the injected liquid fuel was burned. This burning process somewhat resembles that of a conventional liquid fuel oil burner, except that it is carried out intermittently and at high pressure.

Engine torque was adjusted, for this Texas combustion process, by proportionally adjusting the liquid fuel quantity injected into the engine cylinder, using fuel injection pumps and nozzles very similar to diesel engine injection pumps and nozzles. Since a stratified mixture was used, the air quantity inside the engine cylinder did not require adjustment, and an intake manifold throttle valve was not used. In consequence, the engine efficiency losses due to intake air throttling were avoided. Hence, another principal advantage of the Texaco combustion process was that high engine efficiency could be obtained at low engine torque since the usual throttling and consequent pumping power loss was avoided.

Liquid fuel, unevaporated at the start of burning, becomes surrounded by very hot burned gases, essentially devoid of oxygen. Rapid evaporation of liquid followed, but, in the absence of oxygen, this evaporated fuel produced a high yield of soot particles, in a manner similar to soot production in diesel engines. Appreciable portions of this soot survive to exhaust to create an undesirable exhaust soot emission.

The injected liquid fuel volume, being much smaller than the air volume needed for burning, it is difficult to distribute the liquid spray particles uniformly throughout the cylinder air mass. In consequence, the available cylinder air mass is incompletely utilized for burning. For this reason, a larger engine displacement is needed, resulting in increased engine weight and cost than for a comparable conventional gasoline engine.

The liquid fuel is injected at high pressure, and the fuel injector must withstand subsequent peak combustion pressures and the high heat transfer rates which follow. The fuel injection equipment is thus essentially similar to that used with conventional diesel engines and is expensive.

These then are the principal disadvantages of the Texaco combustion process; that exhaust soot is emitted, that a larger engine displacement is needed, and that expensive fuel injection equipment is required. It would be desirable to have available an engine system capable of realizing the knock suppression and reduced pumping friction loss characteristics of this Texaco combustion system, but producing reduced soot emissions, better air utilization, and lower cost fuel injection apparatus.

In my issued U.S. Pat. No. 6,116,207, a fuel air mixer and proportioner is described, comprising combination means for injecting fuel and transferring air from the variable volume chamber, concurrently into a displaceable volume. The resulting displacer air mixture is subsequently delivered back into the engine combustion chamber, to create a stratified mixture therein, within which ignition and burning take place. The injected fuel and transferred air are mixed together in proportions of air mass to fuel mass, sufficiently fuel richer than stoichiometric, that the compression ignition time delay period of all portions of the displacer mixture exceeds the residence time of these portions within the displaceable volume. In this way ignition and combustion occur only within the engine combustion chamber and not within the displaceable volume. Excess heat transfer to the engine cooling jacket is thusly avoided. Additionally the knock suppression benefits and improved mechanical efficiency benefits of the Texaco combustion process are realized, since a stratified air fuel mixture is used.

3. Definitions

The term, piston-type internal combustion engine, is used herein and in the claims to mean an internal combustion engine of the piston and cylinder type, with connecting rod and crankshaft or equivalent, such as the Wankel engine type, or opposed piston-type engines.

Each piston internal combustion engine comprises at least one combined means for compressing and expanding gases, each combined means comprising: an internal combustion engine mechanism comprising a variable volume chamber for compressing and expanding gases, and drive means, such as a connecting rod and crankshaft, for driving said internal combustion engine mechanism and varying the volume of said chamber through repeated cycles. Each variable volume chamber comprises a combustion chamber end at the minimum volume position of the variable volume, and has a maximum volume, when the length is a maximum along the variable dimension thereof.

Each variable volume cycle comprises a compression time interval, when said variable volume is sealed and decreasing, followed by an expansion time interval, when said variable volume is sealed and increasing, these two time intervals together being a compression and expansion time interval.

Each combined means for compressing and expanding further comprises intake means for admitting reactant gases into said variable volume chamber prior to each compression time interval and exhaust means for removing reacted gases from said variable volume chamber after each expansion time interval.

Each variable volume cycle further comprises an exhaust time interval, when said variable volume is opened to said exhaust means, followed by an intake time interval, when said variable volume is opened to said intake means, these two time intervals being an exhaust and intake time interval; said exhaust and intake time interval following after a preceding expansion time interval and preceding a next following compression time interval. For a four stroke cycle piston internal combustion engine each separate time interval occupies approximately one half engine revolution and thus one stroke of the piston. For a two stroke cycle piston internal combustion engine the expansion time interval together with the exhaust time interval occupy approximately a half engine revolution and one piston stroke, and an intake time interval followed by a compression time interval occupy the next following half engine revolution and piston stroke.

A piston internal combustion engine further comprises a source of reactant gas containing appreciable oxygen gas, such as air, for supply to each said intake means for admitting reactant gases into said variable volume chamber.

A piston internal combustion engine further comprises an igniter for igniting fuel air mixtures contained within the combustion chamber of the variable volume chamber. Various types of igniters can be used, such as timed electric sparks, glow plugs, compression ignition via adequate engine compression ratio, and combinations of these igniters.

The combustion time interval is that portion of the compression and expansion time interval when ignition and burning of the air fuel mixture in the engine cylinder is intended to take place. For reasons of engine efficiency, this combustion time interval is preferably intended to occur when the variable volume chamber is at or near to its minimum volume, during or following a compression time interval.

The term reactant gas containing appreciable oxygen gas is used herein and in the claims to mean a reactant gas having a ratio of oxygen gas to inert gases at least about equal to that for air, and which may additionally comprise a principal engine fuel. Ordinary atmospheric air is the most common reactant gas containing appreciable oxygen gas.

Many different types of fuels are suitable for use on internal combustion engines equipped with intake stratifiers of this invention. The following are some examples of suitable commercial fuels:
1. Natural gas
2. Propane and butane
3. Gasoline
4. Diesel fuel and other middle distillate fuels
5. Producer gas
6. Water gas
7. Sewer gas
8. Other manufactured fuel gases In principal, any fuel which, when mixed with air or other oxygen rich gas in suitable proportion, can be spark ignited or compression ignited, is suitable for use with the invention described herein. The term stoichiometric mixture ratio is used herein and in the claims to mean that mixture ratio of fuel to oxygen which, if fully reacted, would produce only complete combustion products.

Hydrocarbon fuels are spark ignitable and flammable over a moderate range of mixture ratios, both fuel leaner and fuel richer than the stoichiometric mixture ratio. Most hydrocarbon fuels are also compression ignitable and over a wider range of mixture ratios than their spark ignitable mixture ratio range, provided adequate compression is used. Hydrocarbon fuels, undergoing compression ignition, exhibit a compression ignition time delay period, between application of compression and occurrence of ignition. This compression ignition time delay period is shortest at mixture ratios at and near to stoichiometric, becoming longer for mixture ratios both leaner and richer than stoichiometric. The octane number, or cetane number, of a hydrocarbon fuel is an indicator of its compression ignition time delay characteristics, longer time delay being indicated by higher octane number or lower cetane number.

SUMMARY OF THE INVENTION

An intake stratifier apparatus of this invention injects fuel and air concurrently into a displaceable volume, appreciably smaller than the engine cylinder displacement volume. The resulting displacer air fuel mixture is then delivered, in pulses, into the engine cylinder, to create a stratified air fuel mixture, following each engine intake process. This stratification of the engine cylinder mixture, largely survives the subsequent compression process, and acts during combustion to suppress knock and other compression ignition violence. Very high engine intake supercharge can thus be used, permitting the adoption of low displacement, low RPM, engines, whose friction power will be low, and whose mechanical efficiency will thus be high, even at low torque operation. This high mechanical efficiency of the engine, at low and moderate torque, translates into high miles per gallon for automobiles and trucks, and this is a principal beneficial object of this invention. Engine efficiency can be further improved by placing insulating, air only, regions of the stratified engine fuel air mixture, next to the engine cylinder head and piston crown. These insulation layers can reduce heat loss to the engine cooling jacket, and thus increase fuel efficiency. Additionally, unburned hydrocarbon emissions and piston ring belt deposits, which originate in these cylinder head and piston crown regions, will be reduced since fuel will not be present there.

BRIEF DESCRIPTION OF THE DRAWINGS

An example form of engine cylinder stratifier apparatus, of this invention, is shown schematically in FIG. 1, on a four stroke cycle, compression ignition, internal combustion, engine.

A relative timing diagram is shown in FIG. 2 for the FIG. 1 example form of engine cylinder stratifier.

Another example form engine cylinder stratifier apparatus, of this invention, is shown schematically in FIG. 3, on a two stroke cycle, spark ignition, opposed piston, internal combustion engine.

A relative timing diagram is shown in FIG. 4 for the FIG. 3 example form of engine cylinder stratifier.

An example variable flow area valve is shown schematically in FIG. 5.

DESCRIPTION OF THE PREFERRED EMBODIMENTS

A. Elements and Operation of the Invention

The engine cylinder stratifier apparatus of this invention is for use as an improved means for creating a stratified fuel and air mixture in the engine cylinder of a piston type internal combustion engine. Each cylinder of an engine is fitted with an engine intake manifold, connected to the intake means for supply of air into the engine variable volume chamber, and through which the intake air flows during the engine intake time interval. Each engine cylinder variable volume chamber has one or more connections to an engine cylinder stratifier apparatus of this invention, via displacer mixture transfer passages. Each engine cylinder stratifier apparatus of this invention comprises the following elements:

1. A moveable displacer piston operates sealably within a stationary displacer cylinder and these enclose a displacer volume;
2. A displacer piston driver mechanism can move the displacer piston in a retraction direction to increase the displacer volume and in a delivery direction to decrease the displacer volume; The maximum displacer volume, at full retraction, is appreciably smaller than the engine displacement volume per engine cylinder; the minimum displacer volume, at full delivery, is preferably as small as mechanically feasible;
3. The displacer piston driver is coupled to the engine crankshaft, via a timer means, so that displacer piston motion is timed, relative to engine piston motion and cycle timing, as follows:
   a. Retraction motion starts after the end of the immediately preceding delivery motion, and ends before the start of the next following delivery motion.
   b. Delivery motion starts after the exhaust time interval, and ends prior to the end of the compression time interval;
   c. A complete sequence of displacer piston retraction motion, followed by displacer piston delivery motion, takes place for each engine cycle;
4. A fuel injector transfers fuel, from a fuel tank, and injects it into the displacer volume, while the displacer piston is being retracted; the fuel quantity thus injected for each engine cycle, is adjusted, in response to required engine torque, via an engine torque regulator acting on the fuel injector apparatus.
5. An air injector transfers air from a displacer air source, and injects it into the displacer volume, also while the displacer piston is being retracted; this air source can be the atmosphere, or the engine intake manifold, or a compressed air reservoir and air compressor, etc.;
6. Preferably fuel injection and air injection, into the displacer volume, occur at the same time, and in counterflow to each other, for better atomization of liquid fuel, and for mixing together of the injected fuel and air; in this way a displacer fuel in air mixture is created within the displacer volume during the retraction motion of the displacer piston;
   g. For the majority of engine applications, and for most engine operating conditions, the displacer air fuel mixture ratio is preferably fuel richer than the stoichiometric fuel air ratio;
   h. One or more displacer mixture transfer passages connect the displacer volume to the engine cylinder and variable volume chamber via displacer mixture transfer valves and actuators, for opening and closing the valve; each transfer passage comprising a transfer valve; the displacer mixture transfer valves are only opened during all, or a portion, of the time when delivery motion of the displacer piston is taking place, during the early part of the engine compression time interval;
7. The one or more displacer mixture transfer passages connect into the variable volume chamber at one or more separate positions along the variable length and around the periphery of the maximum volume of the variable volume chamber;
8. A controller acts upon the fuel injector, the air injector, and the displacer mixture transfer valve, and is responsive to engine cycle timing, and the torque regulator, to assure that:
   a. Fuel is injected into the displacer volume during the retraction motion of the displacer piston;
   b. Air is also injected into the displacer volume during displacer piston retraction;
   c. The displacer mixture is transferred from the displacer volume and into the engine variable volume chamber, during the delivery motion of the displacer piston via at least one displacer mixture transfer passage, and only when the passage is open to the variable volume chamber;
   d. The fuel quantity per engine cycle, thusly injected into the displacer volume is proportioned to the required engine torque;
   e. A wholly mechanical controller could comprise cam operated valves, for the fuel injector, the air injector, and the displacer mixture transfer valve. These cams could be gear-driven from the engine crankshaft, or camshaft, as a timer. Fuel quantity per engine cycle could be proportioned to engine torque by use of a variable volume fuel injector pump, such as the well known Bosch type injection pump;
   f. Alternatively, solenoid operated valves could be used on the fuel injector, the air injector, and the displacer mixture transfer valve. An electronic controller, with an electronic engine cycle timing sensor as an input, could open and close these solenoid valves, to carry out the required control functions. Fuel quantity per engine cycle could be proportioned to engine torque by adjusting the duration of opening of the fuel injector valve, as with a common rail fuel injection system. An advantage of such an electronic controller over a wholly mechanical controller, is that timing and duration of fuel injection, air injection, and displacer mixture transfer, can be more easily adjusted, as desired, while the engine is running.
   g. To achieve a highly stratified engine cylinder mixture in the engine variable volume chamber, the transfer of displacer mixture, from the displacer volume into the variable volume chamber, can occur in a series of several separate pulses, during the early portion of each compression time interval, by action of the controller to open and close the displacer mixture transfer valve several times during each delivery motion of the displacer piston. In this way, additional primary stratification is created, in the variable volume chamber, comprising air only portions plus fuel rich displacer mixture portions;
   h. A secondary stratification can additionally be created, within the displacer mixture, by changing the ratio of instantaneous fuel injection rate, to instantaneous air injection rate, into the displacer volume, during displacer piston retraction. For example, the instantaneous fuel velocity of injection could be varied in pulses during each displacer piston retraction;

B. Beneficial Objects for Gasoline Engines

Large improvements in automobile miles per gallon with spark ignited gasoline engines, can be achieved by reducing engine friction power losses. Gasoline engine friction losses result primarily from pumping work due to intake throttling at part load, and internal rubbing friction particularly between piston rings and cylinder. Both of these friction power losses can be greatly reduced, by use of the engine cylinder stratifier apparatus of this invention with a displacer mixture fuel richer than stoichiometric, as follows:

1. Engine torque is adjusted by adjusting only the fuel quantity. Hence throttling of the principal engine air mass, going into the variable volume chamber during intake, is not used at reduced torque output. Engine friction losses, due to pumping work, are thus avoided. Mixing and interdiffusion, between the fuel rich displacer mixture portions, and the air only portions, of the stratified cylinder mixture, will create spark ignitable zones, which are ignited by the spark igniters. The thusly spark initiated flames progress through the fuel containing regions, as interdiffusion continues to create mixture regions within the inflammable mixture ratio. In this way, essentially complete fuel burning can be achieved, even when overall mixture ratios are fuel leaner than the lean mixture inflammable limit, since stratification, and resulting fuel and air interdiffusion, continue to create zones which are within the inflammable limits, and burning continues within these zones.

2. Internal engine rubbing friction, as between piston rings and cylinder, can be reduced by use of small displacement engines, operated at low speeds. But such small displacement, low speed, engines have very poor torque and performance capabilities. High torque and performance can be restored to these small, low speed, engines by use of very high intake manifold supercharge, of the order of three to four atmospheres, with exhaust gas driven turbochargers.

In a gasoline engine, using conventional, largely unstratified, mixtures, such high supercharge at low engine speed would cause excessive engine knock, due to expiration of the compression ignition time delay, in as yet unburned mixture regions. But, where the fuel air mixture is stratified, these as yet unburned mixture regions are air alone, or fuel rich zones, possessing very long compression ignition time delay periods. Hence, use of stratified mixtures in the variable volume chamber suppresses occurrence of knock, even in highly supercharged, low speed, engines, possessing very low friction loss characteristics.

3. This is a principal beneficial object of the invention described herein, that automobile miles per gallon can be greatly improved by use of these engine cylinder stratifiers. Similar descriptions, of how these beneficial objects can be achieved, are presented in U.S. Pat. No. 5,899,195, col. 8, line 3, through line 22, and col. 21, line 27, through line 59, and this material is incorporated herein by reference thereto.

4. The engine cylinder stratifier apparatus described here, in mechanically simpler and less expensive than the stratifiers described in my following issued U.S. Patents:
   (a) U.S. Pat. No. 5,899,195, issued May 4, 1999
   (b) U.S. Pat. No. 5,899,188, issued May 4, 1999
   (c) U.S. Pat. No. 6,116,207, issued Sep. 12, 2000.

5. The engine cylinder stratifier apparatus described here can more readily create and maintain insulating air only zones next to the engine piston crown and cylinder head, than the intake stratifier apparatus described in my pending U.S. Patent application, "Intake Stratifier Apparatus," Ser. No. 09/617008, filed Jul. 14, 2000. The air only insulating zones created in the intake manifold by the intake stratifier apparatus, may become partially admixed with displacer mixture zones containing fuel whose subsequent burning will thus be poorly insulated from the piston crown or cylinder head. This admixture of air zones and fuel containing zones could be promoted during the flow of the stratified intake mixture into the engine variable volume chamber, during the intake time interval. When, however, the stratification is created only after the air has entered the engine cylinder, and is no longer flowing through intake ports, opportunities for intermixture of displacer mixture zones into insulating air only zones are greatly reduced and the insulation effectiveness correspondingly increased. By placing air only insulating zones adjacent to the engine piston crown and cylinder head, heat loss to the cooling jacket is reduced and engine cycle efficiency improved, since a partially adiabatic engine is achieved. This is one of the principal beneficial objects of the invention described herein, that more effective air insulating blankets can be created and jacket cooling losses reduced.

6. The cylinder head surface, the piston crown surface, and the piston ring belt crevice region, are important sources for unburned hydrocarbon emissions, and also for fuel generated ring belt deposit materials, since fuel burning is quenched in these regions. By placing air only zones, free of fuel, against these surfaces, exhaust emissions of unburned hydrocarbons and accumulation of ring belt deposits, can be reduced. This is another of the beneficial objects achievable by use of the engine cylinder stratifiers of this invention.

D. Beneficial Objects for Diesel Engines

When adequately compressed, hydrocarbon fuel in air mixtures will self ignite, after a compression ignition time delay interval. The duration of this compression ignition time delay varies with fuel to air mixture ratio, being shortest at stoichiometric mixture ratio, and longer for mixtures both fuel leaner and fuel richer than stoichiometric. The compression ignition time delay becomes shorter as pressure rises during compression and combustion. In engine experiments where the entire fuel air mixture is of nearly the same air fuel ratio, and hence of the same compression ignition time delay, the occurrence of compression ignition can be extremely violent, since almost the entire mixture reacts fully in a very short time period. These violent compression ignitions create high engine noise levels, and can cause mechanical damage to the engine.

Conventional diesel engines achieve reasonably gradual compression ignition and burning, by creating air fuel ratio gradients around each atomized liquid particle, as fuel evaporates therefrom, and diffuses into the surrounding air. In this way compression ignition time delay gradients are created around each atomized liquid fuel particle.

Additionally, the liquid fuel is injected and atomized over an appreciable time interval. In consequence, many small separate regions are created, differing as to when their compression ignition time delay will expire, and ignition will occur. Compression ignition thus occurs at different times, in different places, in separate and small mixture regions. As a result, ignition and burning are reasonably gradual, and noise levels are acceptable for conventional diesel engines.

In a conventional diesel engine, liquid fuel, unevaporated at the time of compression ignition for each atomized particle, becomes surrounded with very high temperature burned gases, largely devoid of oxygen. The subsequent evaporation of this liquid is rapid, but its burning is slow, and incomplete, resulting in a high yield of soot particles. Appreciable portions of this soot survives to exhaust, to create an undesirable exhaust soot emission.

An engine cylinder stratifier apparatus of this invention, can be used, with a compression ignition engine, to achieve time and position dispersal of occurrence of compression ignition, similar to a conventional diesel engine, and thus to achieve gradual ignition, with acceptable combustion violence and noise levels. Additionally, the fuel is premixed and pre-evaporated into an air portion, and little or no liquid fuel remains when burning commences. As a result, little or no soot is formed, and exhaust smoke emissions can be much less than produced by conventional diesel engines.

For use in compression ignition engines, an engine cylinder stratifier of this invention will preferably transfer a large number of separate, small, pulses of fuel rich displacer mixture, into several different portions of the air mass in the variable volume chamber. Additionally, secondary stratification is preferably created within the displacer mixture itself, as described herein above. Interdiffusion from each separate primary stratification pulse, each of which has secondary stratification, into adjacent air portions, will create many small separate mixture regions, differing as to when their compression ignition time delay will expire, and ignition will occur. Compression ignition thus occurs at different times, in different places, in separate and small regions. In this way, the same reasonably gradual burning occurs, as in conventional diesel engines, and combustion violence and noise levels are acceptable.

These then are among the beneficial objects of this engine cylinder stratifier invention, when used with compression ignition engines:

a. Compression ignition can be reasonably gradual, with low combustion violence and noise;

b. Soot formation is much less than in conventional diesel engines, resulting in reduced exhaust smoke and odor emissions;

c. This reduced soot formation also reduces the formation of carbonaceous deposits on engine piston crowns, and on engine piston rings, thus reducing engine maintenance costs;

E. An Example Form of the Invention

Figure 1:
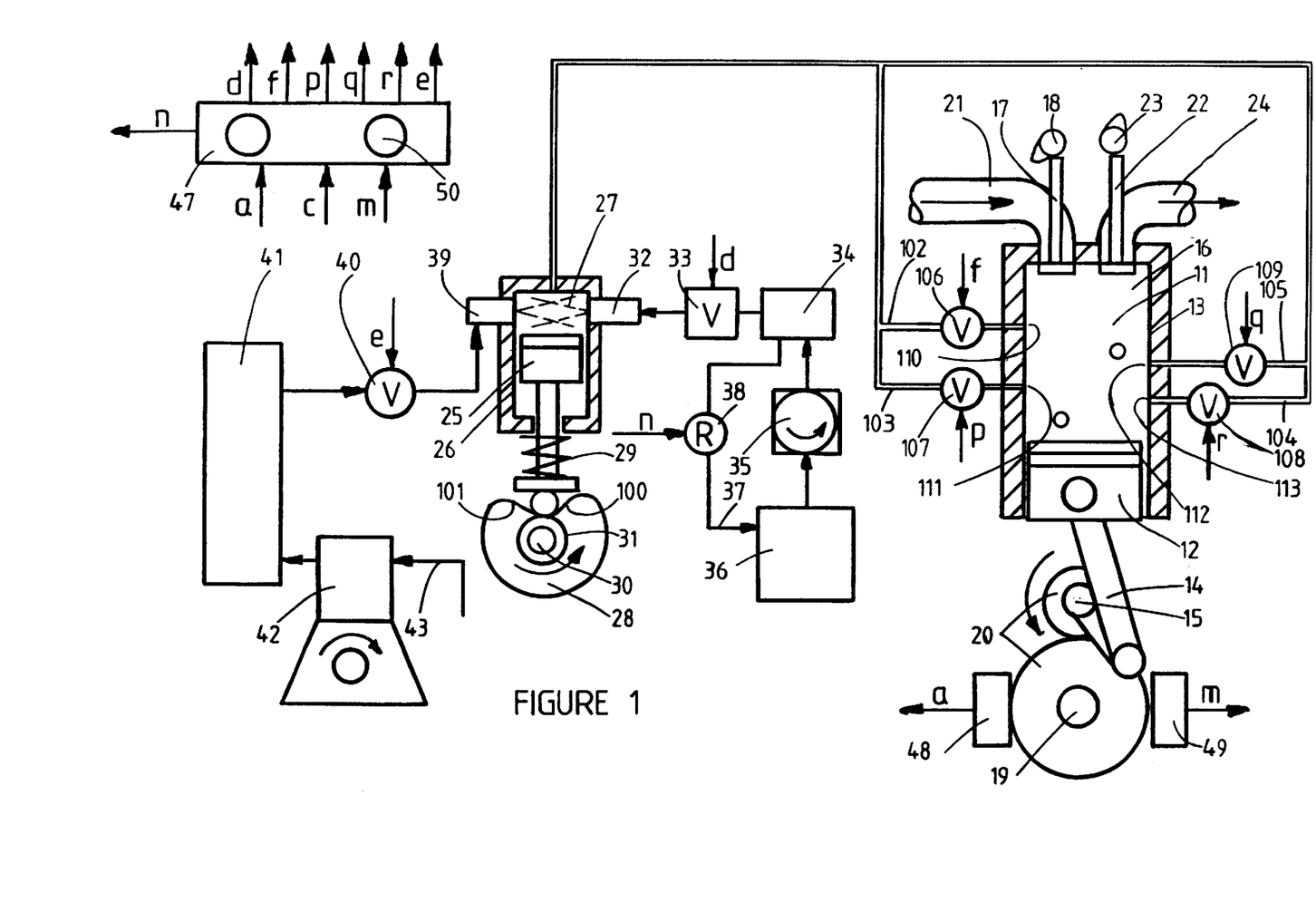

A particular example form of an engine cylinder stratifier apparatus of this invention is shown schematically in FIG. 1, on a four stroke, cycle, compression ignited, internal combustion engine. The relative timing of the engine piston and the displacer piston is illustrated on the diagram of FIG. 2. The four stroke cycle single cylinder engine of FIG. 1 comprises the following elements:

1. The variable volume chamber, 11, is enclosed by the engine piston, 12, and cylinder, 13. The piston, 12, is reciprocated by action of the internal combustion engine mechanism comprising a connecting rod, 14, and crank and crankshaft, 15. This piston motion creates a cycle of variation of the volume of the variable volume chamber, 11. When the piston is at top dead center, this minimum volume of the variable volume chamber defines the combustion chamber, end, 16, of this engine. The maximum volume of the variable volume chamber occurs when the piston is at bottom dead center.

2. An engine intake time interval occurs when the intake value, 17, is opened by the intake cam, 18, actuated by the camshaft, 19, driven via gears, 20, at half crankshaft speed, and the engine piston, 12, is descending to increase the variable volume, 11. During this intake time interval engine intake air is drawn into the variable volume chamber, 11, via the open intake valve, 17, from the intake manifold, 21.

3. A compression time interval follows next after the intake time interval, with the intake valve, 17, and exhaust valve, 22, closed, and the piston, 12, rising to decrease the variable volume, 11.

4. Compression ignition and burning of fuel air mixture occurs within the combustion chamber end, 16, of the variable volume chamber, commencing towards the end of the compression time interval as the piston, 12, is approaching and passing through top dead center.

5. An expansion time interval follows next after the compression time interval, with the intake valve, 17, and exhaust valve, 22, closed, and the piston, 12 descending to increase the variable volume, 11.

6. An engine exhaust time interval occurs when the exhaust valve, 22, is opened by the exhaust cam, 23, actuated also by the camshaft, 19, and the engine piston, 12, is rising to decrease the variable volume, 11. During this exhaust time interval burned gases are forced out of the variable volume chamber, 11, via the open exhaust valve, 22, into the exhaust pipe, 24.

7. The intake time interval for the next following engine cycle commences after the exhaust time interval.

Figure 2:
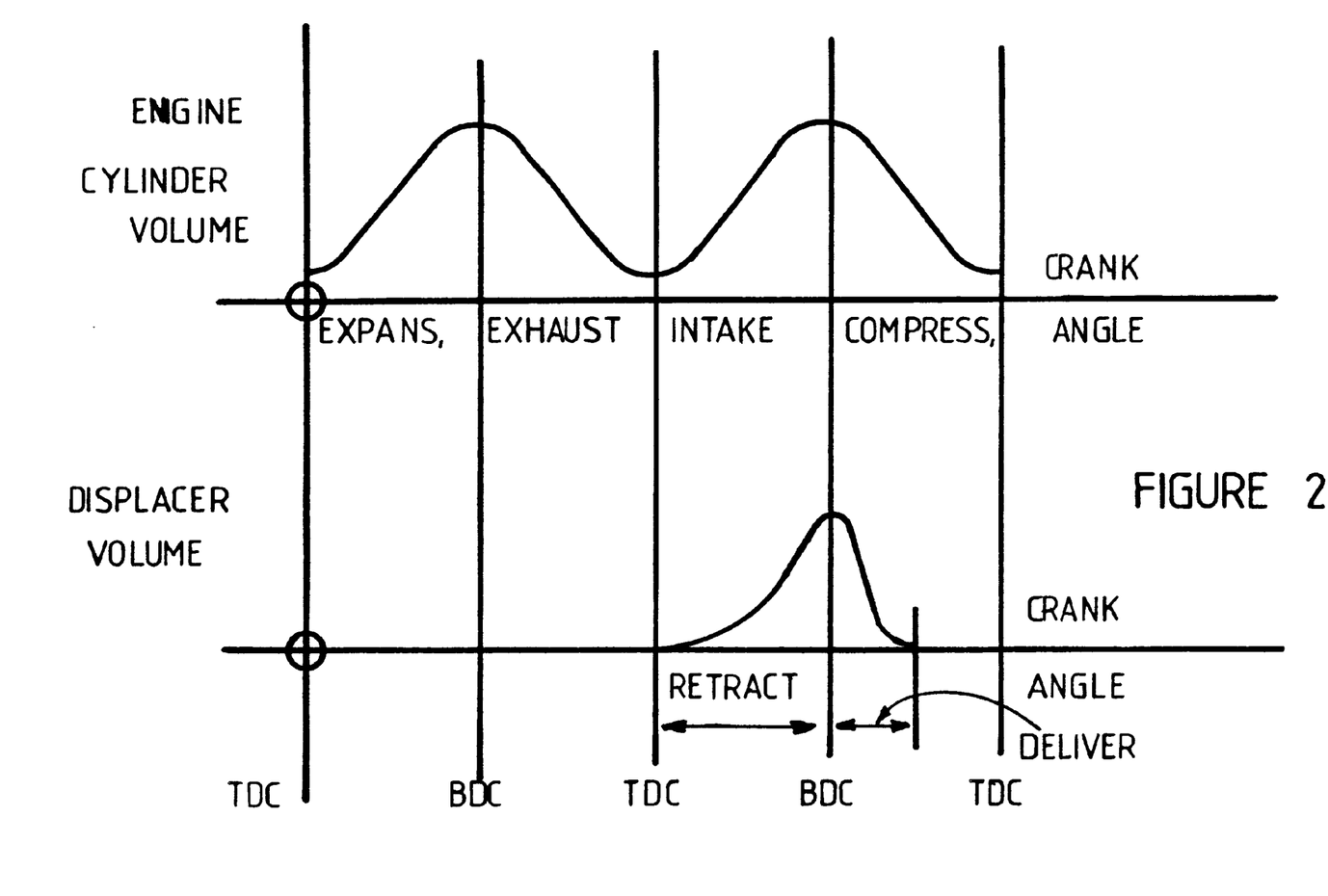

Each engine cylinder and variable volume chamber, 11, is connected to an engine cylinder stratifier apparatus of this invention, which comprises the following elements:

8. The displacer piston, 25, operates sealably within the displacer cylinder, 26, to vary the displacer volume, 27, and is driven by the displacer cam, 28, and return spring, 29, and displacer camshaft, 30, driver mechanism, whose timer gear, 31, rotates the displacer camshaft, 30, at engine camshaft, 19, speed. Displacer piston, 25, motion is timed relative to engine piston, 12, motion so that, when the variable volume, 11, is starting to decrease, at the start of the compression time interval, the displacer volume, 27, is starting to decrease, with a delivery motion, as shown in FIG. 2. Delivery motion of the displacer piston, 25, fully into the displacer volume, 27, is preferably completed, during the early portions of the compression time interval, by the delivery portion, 100 of the displacer cam, 28, as shown in FIG. 2. Retraction of the displacer piston, 25, to fully increase the displacer volume, 27, is timed, by the return spring 29, and retraction portion, 101, of the displacer cam, 28, to be completed preferably shortly before the start of the next following delivery motion, as also shown in FIG. 2.

9. This timing of displacer piston, 25, delivery motion and retraction motion, relative to engine piston motion is shown on the related timing diagrams of FIG. 2, wherein variable volume, 11, is plotted against engine crank angle, CA, in the upper diagram, and displacer volume, 27, is plotted also against engine crank angle, CA, in the lower, time related, diagram.

10. An example common rail fuel injection system is shown schematically in FIG. 1 and comprises: a fuel injector, 32, connected via a fuel control valve, 33, to the common rail, 34, into which the engine driven fuel pump, 35, pumps fuel from a fuel source, 36, at a rate well in excess of the fuel flow to the engine, this excess fuel returning to the fuel source, 36, via the passage, 37, with flow restriction, 38. The flow restriction, 38, is sized relative to the fuel pump, 35, so that an adequate fuel atomization pressure is obtained in the common rail, 34, when the liquid fuel is injected into the displacer volume, 27, via the fuel injector, 32, when the fuel valve, 33 is open and the displacer piston, 25, is being retracted;

11. An example air injector system is shown schematically in FIG. 1, and comprises: an air injector, 39, connected via an air control valve, 40, to the displacer air tank, 41, into which the engine driven air compressor, 42, pumps air from a compressor air source, 43, such as the atmosphere, or the engine intake manifold, 21. The air compressor, 42, capacity is sized, relative to the air flow into the displacer volume, 27, so that an adequate air flow velocity is obtained when the displacer air is injected into the displacer volume, 27, when the air valve, 40, is open and the displacer piston, 25, is being retracted;

12. Preferably air injection and fuel injection into the displacer volume, 27, occur concurrently, and with opposed flow, as shown in FIG. 1, in order to obtain maximum fuel atomization, and mixing with the injected air. In this way a displacer fuel air mixture is created within the displacer volume, while the displacer piston, 25, is being retracted, prior to the next engine compression time interval;

13. The displacer volume, 27, is connected to the variable volume chamber, 11, by several separate displacer mixture transfer passages, 102, 103, 104, 105, with displacer mixture transfer valves and actuators, 106, 107, 108, 109, which connect into the variable volume chamber at several different positions, 110, 111, 112, 113, along the variable length of the variable volume and around the periphery thereof. During the delivery motion of the displacer piston, 25, displacer mixture is transferred from the displacer volume, 27, into the variable volume chamber, 11, via those displacer mixture transfer passages whose exit position, 110, 111, 112, 113, is not yet covered by the engine piston, 12, and whose transfer valve, 106, 107, 108, 109, is open. This transfer of displacer piston delivery motion can occur continuously during displacer piston delivery motion, or intermittently in pulses through each separate transfer passage, by opening and closing the displacer mixture transfer valves, 106, 107, 108, 109, several times during each delivery motion of the displacer piston. In this way an additionally stratified fuel air mixture can be created within the variable volume chamber, during the early part of the compression time interval.

14. The example electronic controller, 47, receives an engine cycle timing input, a, from a cycle timing sensor, 48, on the engine camshaft, 19, and an engine torque requirement input, c, from the engine torque regulator, and is operative upon solenoid actuated fuel injector valve, 33, via output, d, and displacer mixture transfer valves, 106, 107, 108, 109, via outputs f, p, q, r, and upon air injector valve, 40, via output, e, so that:
  a. Fuel and air are injected into the displacer volume, 27, only during displacer piston retraction motion;
  b. Displacer mixture is transferred into the engine variable volume chamber 11, only during displacer piston delivery motion; and when the exit ports, 110, 111, 112, 113, are uncovered by the engine piston, 12;
  c. The fuel quantity injected into the displacer volume, per engine cycle, is proportioned to required engine torque, as for example, by adjusting the duration of fuel injection per engine cycle;

15. The controller, 47, may additionally comprise an engine speed sensor, 49, with input, m, and an adjustor, 50, so that the controller can cause the several displacer mixture transfer valves, 106, 107, 108, 109, to open and close several times, during each displacer piston delivery, and thus to create several separate pulses of displacer mixture flow into the engine variable volume chamber. Additional primary stratification of the engine variable volume mixture is thusly created, comprising several fuel rich displacer mixture zones, separated by air only zones. The number of pulses per engine cycle, as well as the duration of each pulse, can be adjusted via the adjustor, 50, in response to changes in the type of fuel being used, and also to changes in engine operating conditions;

F. Another Example Form of the Invention

Figure 3:
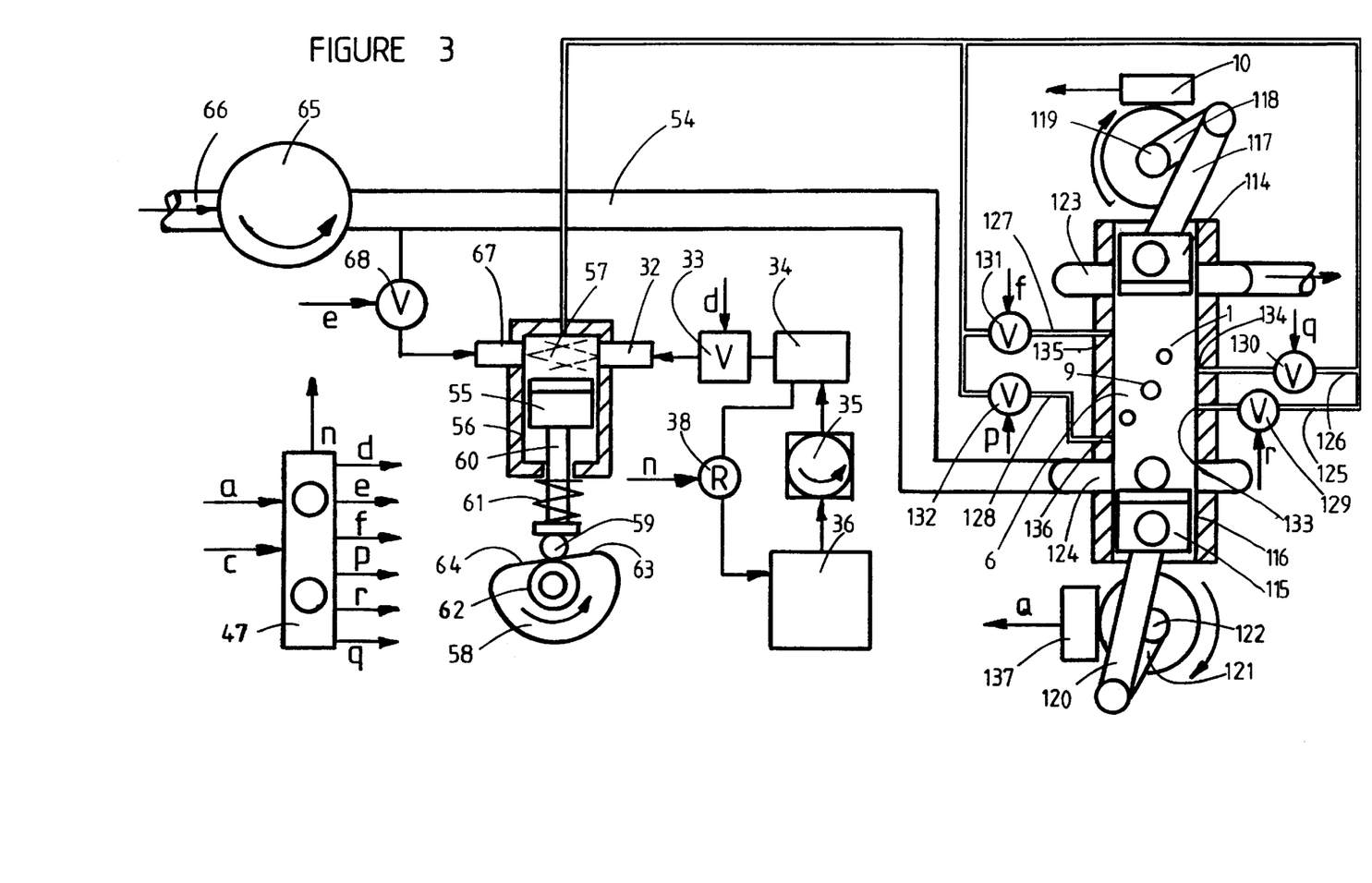
Figure 4:
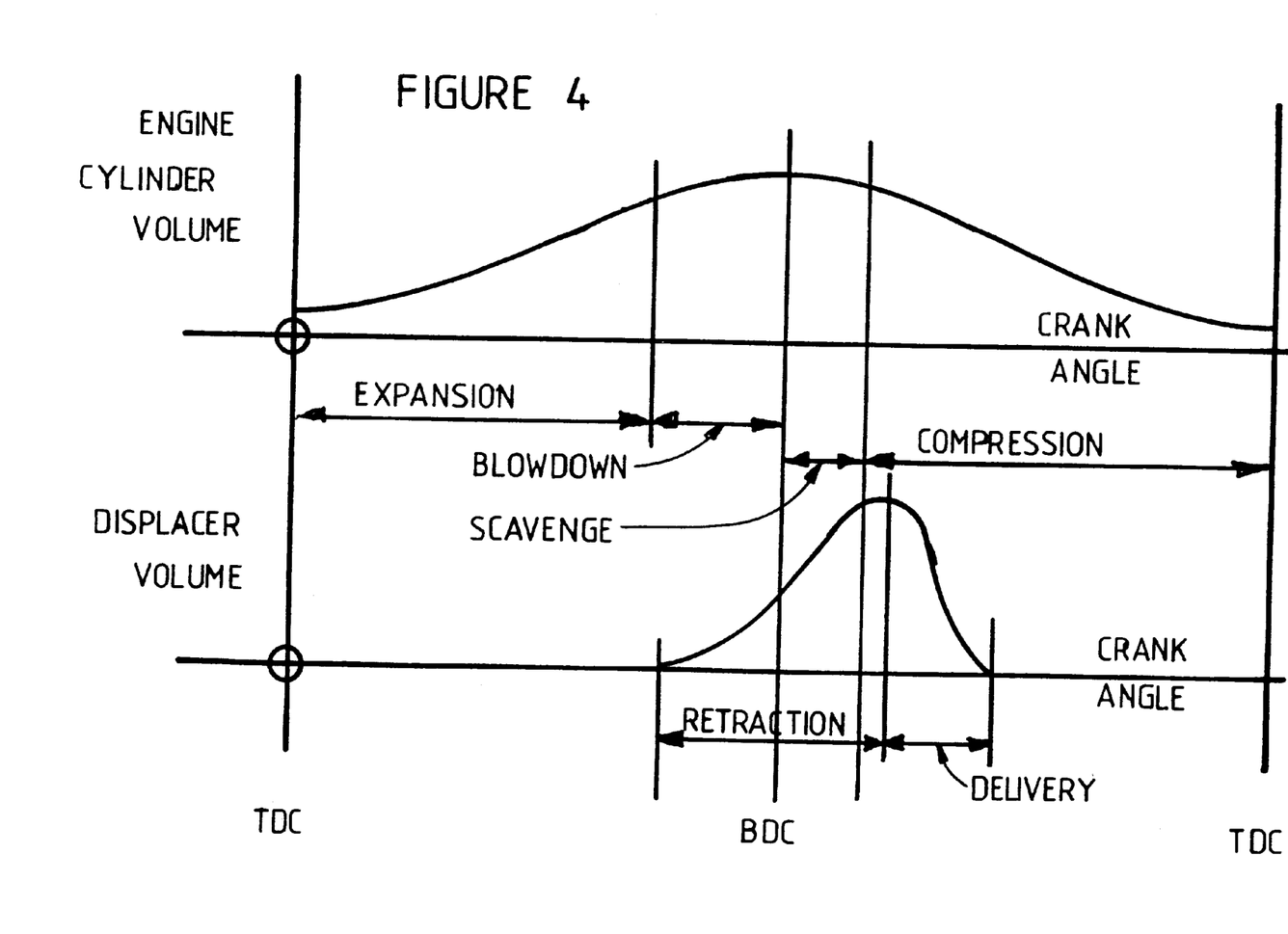

Another particular example form of an engine cylinder stratifier apparatus of this invention is shown schematically in FIG. 3, on a two stroke cycle, spark ignited, opposed piston, internal combustion engine. The relative timing of the opposed engine pistons and the displacer piston is illustrated on the diagram of FIG. 4. The two stroke cycle, opposed piston, single cylinder engine of FIG. 3 comprises the following elements:

1. The variable volume chamber, 1, is enclosed by the opposed pistons, an intake piston, 115, and an exhaust piston, 114, and the cylinder, 116. The opposed pistons, 114, 115, are reciprocated oppositely, by action of the internal combustion engine mechanism comprising:
  a. An exhaust piston connecting rod, 117, crank, 118, and crankshaft, 119;
  b. An intake piston connecting rod, 120, crank, 121, and crankshaft, 122;
  c. The exhaust crankshaft, 119, and intake crankshaft, 122, are positively connected together, as by gear or chain drive, not shown on FIG. 3.
  d. Frequently the exhaust crank, 118, and the intake crank, 121, are separated angularly by a small phase angle so that the exhaust ports, 123, are opened before the intake ports, 124, are opened, and also so that the exhaust ports are closed before the intake ports are closed. This phase angle separation of the two cranks allows blowdown of exhaust gas to be carried out, before intake ports are opened, and allows continued air inflow after exhaust ports are closed;
  e. The minimum volume of the variable volume chamber, 1, when the two pistons come closest together, defines the combustion chamber, 6, of this engine;
  f. The intake time interval occurs while the intake ports, 124, are uncovered by the intake piston, 115. The exhaust time interval occurs while the exhaust ports, 123, are uncovered by the exhaust piston, 114;
  g. A compression time interval occurs, after the exhaust and intake ports are covered, when the two pistons are moving towards each other;
  h. An expansion time interval follows after a compression time interval, when the two pistons are moving away from each other, before again opening, first the exhaust ports, and then the intake ports;

2. Whenever fuel from any source and air are both present within the variable volume chamber, combustion can take place during such a potential combustion time interval. The actual combustion time interval commences when this fuel air mixture is ignited, as by a spark at spark electrodes 9, energized from a spark energizer and timer, 10. For reasons of engine cycle efficiency the combustion time interval preferably commences during the latter portions of the compression time interval and ends during the early portions of the expansion time interval, and the spark energizer, 10, is timed accordingly;

Each engine cylinder and variable volume chamber, 1, is connected to an engine cylinder stratifier apparatus of this invention, which comprises the following elements:

3. The displacer piston, 55, operates sealably within the displacer cylinder, 56, to vary the displacer volume, 57, and is driven by the displacer cam, 58, cam follower, 59, piston rod, 60, and retract spring, 61, driver mechanism, whose timer gear, 62, rotates the displacer cam, 58, at engine crankshaft, 122, speed and times displacer piston, 55, motion, relative to motion of the engine piston, so that, displacer volume, 57, is decreasing, with a delivery motion, as shown in FIG. 3, when the intake port, 124, is covered by the intake piston, 115, at the start of the compression time interval. This delivery motion of the displacer piston, 55, is caused by the delivery portion, 63, of the displacer cam, 58, and is completed during the early part of the compression time interval. Also the displacer piston, 55, retraction motion is timed, relative to the motion of the engine piston, so that retraction motion starts sometime after completion of a prior delivery motion and ends prior to the start of the next following deliver motion, and is caused by the retract spring, 61, and retract portion, 64, of the displacer cam, 58.

4. This timing of displacer piston, 55, delivery motion and retraction motion, relative to motion of the engine piston, motion is shown on the related timing diagrams of FIG. 4, wherein variable volume, 1, is plotted against engine crank angle, CA, in the upper diagram, and displacer volume, 57, is plotted also against engine crank angle, CA, in the lower, time related, diagram.

5. The example common rail fuel injection system, shown in FIG. 3, is similar to the fuel injection system shown in FIG. 1, and also comprises: a fuel injector, 32, fuel control valve, 33, common rail, 34, engine driven fuel pump, 35, fuel source, 36, and flow restriction, 38. These elements of the common rail fuel injection system of FIG. 3, operate in the same manner, as described hereinabove for the FIG. 1 form of the invention, to inject fuel into the displacer volume, 57, when the displacer piston, 55, is being retracted;

6. The engine intake manifold, 54, of FIG. 3, is supplied with engine intake air compressed by the supercharger, 65, to a pressure well above the atmospheric pressure at supercharger inlet, 66. The supercharger, 65, can be an engine driven compressor or an engine exhaust gas driven turbocharger for example;

7. The air injection system of FIG. 3 comprises an air injector, 67, connected via an air control valve, 68, to the engine intake manifold, 54, downstream in the direction of intake air flow, from the intake supercharger, 65. When the displacer piston, 55, is being retracted, the air control valve, 68, is opened, and a portion of compressed air is transferred from the intake manifold, 54, into the displacer volume, 57.

8. Preferably air and fuel injection into the displacer volume occur concurrently, to create a well mixed displacer fuel air mixture therein, during displacer piston retraction, as described herein above for the FIG. 1 form of the invention;

9. Displacer mixture is transferred from the displacer volume, 57, into the variable volume, 1, during delivery motion of the displacer piston, 55, via the several separate displacer mixture transfer passages, 125, 126, 127, 128, with displacer mixture transfer valves, 129, 130, 131, 132. These several displacer mixture transfer passages connect separately into the variable volume chamber at several different exit positions, 133, 134, 135, 136, along the variable length of the variable volume and around the periphery thereof. Displacer mixture is transferred via these passages when the transfer valves, 129, 130, 131, 132, are opened, and when the exit ports, 133, 134, 135, 136, are not covered by the exhaust piston, 114, or the intake piston, 115. Continuous or pulsed transfer of displacer mixture into the variable volume chamber can be utilized, as described hereinabove for the FIG. 1 example of the invention.

10. The electronic controller, 47, with cycle timing sensor, 137, input, a, and engine torque regulator input, c, operates on the fuel injector valve, 33, air injector valve, 68, and displacer mixture transfer valves, 129, 130, 131, 132, in the same manner, as described hereinabove for the FIG. 1 form of the invention, so that: fuel and air are injected into the displacer volume during displacer piston retraction; displacer mixture is transferred into the engine variable volume chamber during displacer piston delivery motion; fuel quantity per engine cycle, injected into the displacer volume is proportioned to required engine torque.

11. The controller, 47, may additionally function to cause displacer mixture transfer to occur in several separate pulses into the engine variable volume chamber to create additional primary stratification within each engine cylinder mixture, as described hereinabove for the FIG. 1 form of the invention. By alternating the pulsed openings and closings of the several separate displacer mixture transfer valves, 129, 130, 131, 132, an additional degree of primary stratification can be created in the variable volume chamber, since the several separate transfer passages, 125, 126, 127, 128, connect into the variable volume chamber at different positions, 133, 134, 135, 136.

12. The controller, 47, may further additionally function to cause fuel injection or air injection, to occur in several pulses into the displacer volume, to create a secondary stratification within each displacer mixture, as described hereinabove for the FIG. 1 form of the invention.

13. The delay of displacer mixture transfer into the variable volume chamber until after the engine exhaust ports, 123, are covered by the exhaust piston, 114, assures that no fuel is lost, unburned, into exhaust during scavenging.

G. Modified Elements

1. A conventional piston and cylinder displacer is shown in FIG. 1 and FIG. 3. But other, equivalent, types of displacers can also be used, for the purposes of this invention, such as vane type compressor displacers; elliptical displacer pistons could be used to lengthen the fuel injection path and thus improve atomization.

2. A common rail fuel injection system is shown in FIG. 1 and FIG. 3. But other, equivalent types of fuel injection systems can also be used, for the purposes of this invention, such as conventional, Bosch type, variable volume, fuel pump and injector systems;

3. In the example forms of the invention, shown in FIG. 1 and FIG. 3, a single intake stratifier apparatus is shown serving a single engine cylinder. But portions of each stratifier apparatus can usually serve more than one cylinder of a multicylinder engine.

H. Secondary Stratification

In some engine applications it may be preferable to utilize, not only primary stratification, within the engine cylinder mixture, but, additionally, secondary stratification within the displacer mixture. Such primary plus secondary stratification can be used to greatly reduce the violence of compression ignition initiation of burning in engines. Such secondary stratification of the displacer mixture can be created by varying the ratio of instantaneous fuel injection rate, to instantaneous air injection rate, into the displacer volume, during each retraction of the displacer piston. An example variable flow area valve is shown in FIG. 5, and FIG. 1, which could be used either as the air control valve, 40, in FIG. 1, or alternatively, as the fuel return flow restriction, 38, in FIG. 1, to create this desired variation of fuel, flow rate to air flow rate during each retraction of the displacer piston, 25.

Figure 5:
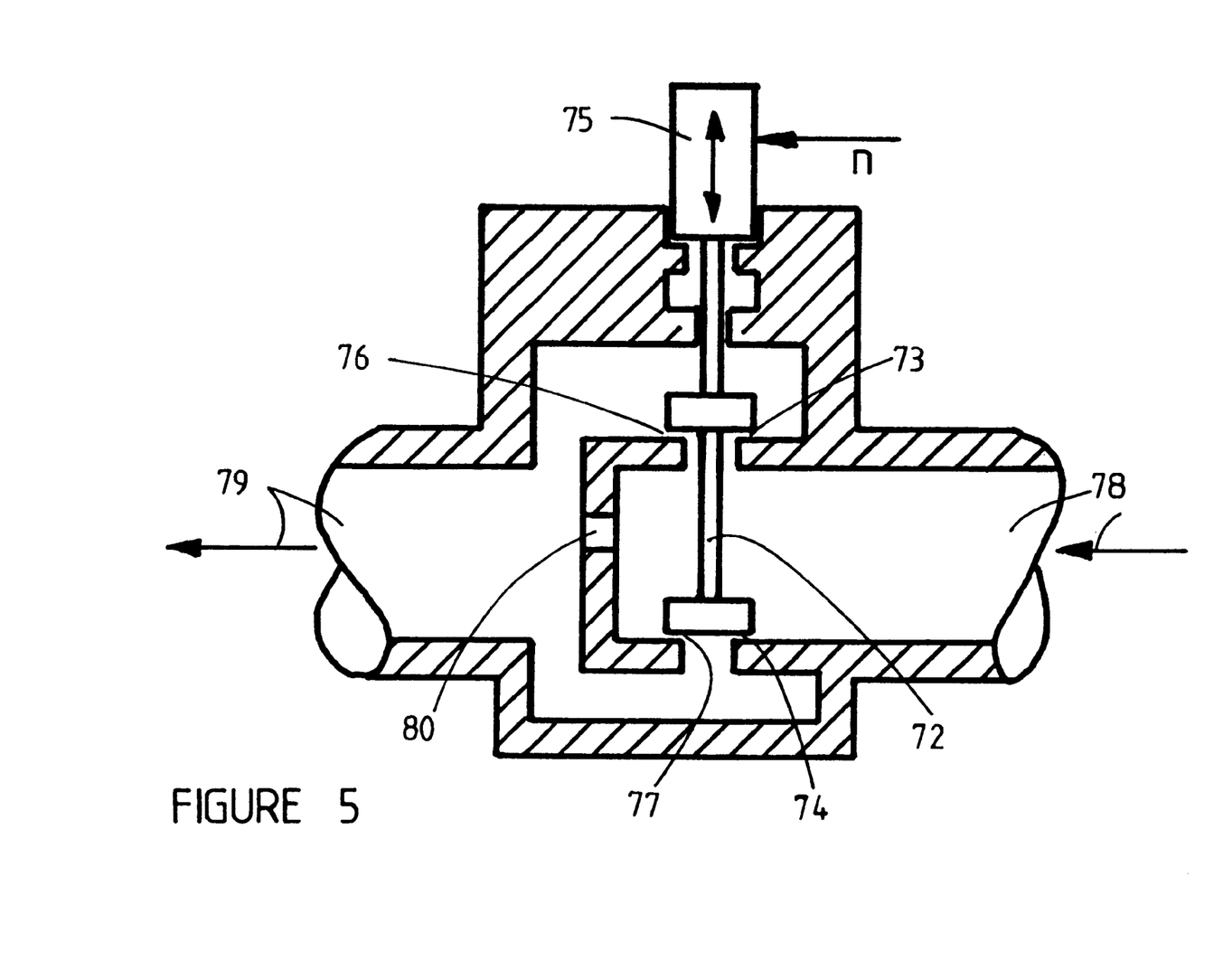

The variable flow area valve of FIG. 5 comprises the following elements:

1. The pressure balanced valve element, 72, comprises an upper seat, 73, and a lower seat, 74;
2. The valve element, 72, can be vibrated by the solenoid driver, 75, which receives variable energizing, n, from the controller, 47, during displacer piston retraction. The two valve flow areas, 76, 77, are thusly varied during retraction; this variation of flow area causes a variation of instantaneous flow velocity, from valve inlet, 78, to valve outlet, 79, of either the air, or the fuel, flowing into the displacer volume, 27. In this way a secondary stratification of fuel air mixture can be created in the displacer mixture;
3. If complete stoppage, of either air flow, or fuel flow, into the displacer volume, is to be avoided during displacer piston retraction, the two valve flow areas can always be greater than zero, throughout the full range of vibration of the valve element, 72. Alternatively, a small bleed flow passage, 80, can be provided between valve inlet, 78, and valve outlet, 79. For this case, an additional series air control valve element may be preferred, which fully stops air flow into the displacer volume, but is open during displacer piston retraction.

I. Stratification Patterns

Various fuel in air stratification patterns can be created in the engine variable volume chamber, by use of the engine cylinder stratifier apparatus of this invention. Additionally, the stratification pattern can be changed, in response to changes in engine operating conditions or changes in the fuel being used. The following examples illustrate some types of stratification pattern, and the benefits achievable by their use.

1. Retaining two, separate, air only, insulating blankets immediately adjacent to both the engine piston crown, and the engine cylinder head, would reduce heat loss to the engine cooling jacket, and thus increase the engine fuel efficiency. A partially adiabatic engine is thus achieved, using air as the insulating layer, instead of solid ceramic materials, as used in earlier adiabatic engines, such as described in the references: *"Ceramics for Adiabatic Diesel Engines,"* R. Kamo, M. Woods, and W. Geary, CIMTECH, Jun. 4, 1979; *"Thermal Barrier Coating for Diesel Engine Piston,* R. Kamo, M. Woods, T. Yamada, and M. Mori, ASME Paper 80-DGP-14, 1980. Such air insulating blankets can be achieved by use of the engine cylinder stratifiers of this invention, by positioning the displacer mixture exits, 133, 134, 135, 136, into the variable volume chamber, 1, so that displacer mixture portions are not placed into the air portions, next to the pistons or cylinder heads of the engine. When maximum engine torque, and hence maximum air utilization, is required, additional displacer mixture transfer passages can be opened, whose added exits inject displacer mixture into those air portions adjacent to piston crowns and cylinder heads. The insulating blanket is then largely lost, but full air utilization can be achieved to yield maximum torque. Alternatively, as engine torque is reduced, the portion of the maximum variable length of the variable volume chamber, into which displacer mixture is injected, can be reduced from both ends of this length, thus increasing the thickness and insulating effect of both air only blankets. In this way cooling jacket heat loss can be further reduced and engine efficiency increased at part load operation.

2. The cylinder head surface, the piston crown surface, and the piston ring belt crevice region, are important sources for unburned hydrocarbon exhaust emissions, and also for fuel generated ring belt deposit materials, since fuel burning is quenched in these regions. By placing air only blankets, free of fuel, against these surfaces, exhaust emissions of unburned hydrocarbons, and accumulation of piston ring belt deposits, can be reduced.

These are additional beneficial objects, achievable by using the engine cylinder stratifier apparatus of this invention, to create an air insulating blanket pattern of stratification.

J. Sizing

The approximate sizing methods described on page 33, line 18 through page 37, line 18 of my earlier filed U.S. patent application, Ser. No. 09/617008, entitled, "Intake Stratifier Apparatus," can also be used for the sizing of an engine cylinder stratifier of this invention, and this material is incorporated herein by reference thereto.

Having thus described my invention, what I claim is:

1. In a piston internal combustion engine comprising: at least one combined means for compressing and expanding gases, each said combined means comprising an internal combustion engine mechanism comprising a variable volume chamber for compressing and expanding gases and comprising an engine piston operative within an engine cylinder, and drive means for driving said internal combustion engine mechanism and varying the volume of said chamber through repeated cycles;

said variable volume chamber comprising a combustion chamber end, at the minimum volume of said variable volume chamber, and having a maximum volume, when the length of said variable volume is a maximum along that dimension of said variable volume which varies during each engine cycle;

each said variable volume cycle comprising a compression time interval, when said variable volume is sealed and decreasing, followed by an expansion time interval, when said variable volume is sealed and increasing, these two time intervals together being a compression and expansion time interval;

each said combined means for compressing and expanding further comprising intake means for admitting reactant gases into said variable volume chamber prior to each said compression time interval, and an intake manifold connecting said intake means to a source of engine intake air; exhaust means for removing reacted gases from said variable volume chamber after each said expansion time interval; and ignition means for igniting fuel air mixtures within said variable volume chamber;

each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, such as air, to each said intake means for admitting reactant gases into said variable volume chamber, each cycle of said variable volume chamber further comprising a potential combustion time interval comprising that portion of said compression and expansion time interval during which fuel from any source, and reactant gas containing appreciable oxygen gas, are both present within said variable volume chamber; each cycle of said variable volume chamber further comprising a combustion time interval during which the fuel and oxygen contents of the variable volume chamber are ignited and burned therein;

wherein the improvement comprises adding a sufficient number of engine cylinder stratifiers to said internal combustion engine so that each said variable volume chamber is served by at least one engine cylinder stratifier apparatus; each said engine cylinder stratifier apparatus comprising:

a moveable displacer piston, sealably operative within a stationary displacer cylinder, and these enclosing a displacer volume;

a displacer piston driver means for moving said displacer piston, in a retraction direction to increase said displacer volume, and in a delivery direction to decrease said displacer volume;

a driver timer means for timing the moving of said displacer piston, relative to the engine cycle timing, so that:

said retraction motion commences after the ending of the prior delivery motion, and ends prior to the start of the next following delivery motion;

said delivery motion commences after said exhaust time interval and ends prior to the end of said compression time interval;

said retraction motion, followed by said delivery motion, occurs for each engine cycle;

a source of fuel;

fuel injector means for transferring fuel from said source, and injecting it into said displacer volume, while said retraction motion is occurring, and comprising; injector adjustment means for adjusting the quantity of fuel injected into said displacer volume during each engine cycle, said fuel quantity being adjusted in response to required engine torque output;

a source of displacer air:

air injector means for transferring air from said displacer air source, and injecting it into said displacer volume, while said retraction motion is occurring; whereby a displacer fuel in air mixture is created within said displacer volume during said retraction motion of said displacer piston;

an engine intake manifold means connected to said engine intake means, so that engine intake air entering into said engine variable volume chamber, during said intake time interval, flows through said engine intake manifold;

at least one displacer mixture transfer passage, between said displacer volume and said variable volume chamber, each said transfer passage comprising a displacer mixture transfer valve and actuator means for opening and closing said displacer mixture transfer passage, so that said displacer mixture can be transferred into said variable volume chamber, whenever said displacer mixture transfer passage is open to said variable volume chamber, and said delivery motion is also occurring;

each said displacer mixture transfer passage connecting separately into said variable volume chamber;

an engine cycle timing sensor;

an engine torque regulator;

controller means for controlling said fuel injector means, said air injector means, said displacer mixture transfer valves and actuators, and responsive to said engine cycle timing sensor and said engine torque regulator, so that:

fuel is injected into said displacer volume during said retraction motion of said displacer piston;

air is injected into said displacer volume during said retraction motion of said displacer piston;

displacer mixture is transferred from said displacer volume, into said variable volume chamber, during said delivery motion of said displacer piston; via at least one of said displacer mixture passages, and only when said at least one passage is open to said variable volume chamber;

the fuel quantity thusly injected into said displacer volume, per engine cycle is proportioned to required engine torque output.

2. In a piston internal combustion engine, as described in claim 1:

wherein said air injector means and said fuel injector means further comprise displacer mixture ratio adjustment means for adjusting the mass ratio of fuel to air of said displacer fuel in air mixture;

and further wherein said controller means is additionally operative upon said displacer mixture ratio adjustment means, so that;

said displacer mixture is fuel richer than the stoichiometric mixture ratio of the fuel.

3. In a piston internal combustion engine as described in claim 2:

wherein said controller means additionally controls said fuel injector and said air injector so that said injection of fuel into said displacer volume occurs concurrently with said injection of air into said displacer volume.

4. In a piston internal combustion engine as described in claim 3, wherein said controller means further controls said air injector means, and said fuel injector means, so that the ratio of instantaneous fuel injection rate to instantaneous air injection rate, varies during each displacer piston retraction motion.

5. In a piston internal combustion engine as described in claim 4:
wherein said delivery motion commences after said intake time interval and ends in the early portions of said compression time interval.

6. In a piston internal combustion engine, as described in claim 5:
wherein there are several of said displacer mixture transfer passages, between said displacer volume and said variable volume chamber, each of said several transfer passages connecting separately into different positions along the length and around the periphery of the maximum volume of said variable volume chamber;
wherein said controller means further functions so that, as engine torque is decreased, the number of said several displacer mixture transfer passages opened during each engine cycle is decreased;
and further, so that as engine torque is decreased, the portion of the length of said maximum volume of said variable volume chamber, into which displacer mixture is injected, via said several displacer mixture transfer passages, is decreased from both ends of said length.

7. In a piston internal combustion engine as described in claim 6:
wherein said source of displacer air is said engine intake manifold;
said piston internal combustion engine further comprising an intake supercharger means for increasing the pressure of air in said engine intake manifold.

8. In a piston internal combustion engine as described in claim 7;
wherein said controller means further controlling said displacer mixture transfer valves and actuators, so that said displacer mixture is transferred from said displacer volume into said variable volume chamber as at least two separate pulses per engine cycle.

9. In a piston internal combustion engine as described in claim 6, and further comprising
a source of compressor air;
wherein said source of displacer air comprises an air tank into which an air compressor pumps air from said compressor air source.

10. In a piston internal combustion engine as described in claim 9,
wherein said controller means further controlling said displacer mixture transfer valves and actuators, so that said displacer mixture is transferred from said displacer volume into said variable volume chamber as at least two separate pulses per engine cycle.

11. In a piston internal combustion engine as described in claim 3:
wherein said delivery motion commences after said intake time interval and ends in the early portions of said compression time interval.

12. In a piston internal combustion engine as described in claim 11;
wherein there are several of said displacer mixture transfer passages between said displacer volume and said variable volume chamber, each of said several transfer passages connecting separately into different positions along the length and around the periphery of the maximum volume of said variable volume chamber;
wherein said controller means further functions so that, as engine torque is decreased, the number of said several displacer mixture transfer passages opened during each engine cycle is decreased;
and further so that as engine torque is decreased, the portion of the length of said maximum volume of said variable volume chamber, into which displacer mixture is injected via said several displacer mixture transfer passages, is decreased from both ends of said length.

13. In a piston internal combustion engine as described in claim 12:
wherein said source of displacer air is said engine intake manifold;
said piston internal combustion engine further comprising an intake supercharger means for increasing the pressure of air in said engine intake manifold.

14. In a piston internal combustion engine as described in claim 13:
wherein said controller means further controlling said displacer mixture transfer valves and actuators, so that said displacer mixture is transferred from said displacer volume into said variable volume chamber as at least two separate pulses per engine cycle.

15. In a piston internal combustion engine as described in claim 12, and further comprising:
a source of compressor air;
wherein said source of displacer air comprises an air tank into which an air compressor pumps air from said compressor air source.

16. In a piston internal combustion engine as described in claim 15;
wherein said controller means further controlling said displacer mixture transfer valves and actuators, so that said displacer mixture is transferred from said displacer volume into said variable volume chamber as at least two separate pulses per engine cycle.

17. In a piston internal combustion engine as described in claim 1; and further comprising:
a source of compressor air;
wherein said source of displacer air comprises an air tank into which an air compressor pumps air from said compressor air source.

18. In a piston internal combustion engine as described in claim 1:
wherein said source of displacer air is said engine intake manifold;
said piston internal combustion engine further comprising an intake supercharger means for increasing the pressure of air in said engine intake manifold.

19. In a piston internal combustion engine as described in claim 1,
wherein said controller means further controlling said displacer mixture transfer valves and actuators, so that said displacer mixture is transferred from said displacer volume into said variable volume chamber as at least two separate pulses per engine cycle.

20. In a piston internal combustion engine as described in claim 1;

wherein there are several of said displacer mixture transfer passages, between said displacer volume and said variable volume chamber, each of said several transfer passages connecting separately into different positions along the length and around the periphery of the maximum volume of said variable volume chamber;

wherein said controller means further functions so that as engine torque is decreased, the number of said several displacer mixture transfer passages opened during each engine cycle is decreased;

and further so that as engine torque is decreased, the portion of the length of said maximum volume of said variable volume chamber, into which displacer mixture is injected via said several displacer mixture transfer passages, is decreased from both ends of said length.

* * * * *

UNITED STATES PATENT AND TRADEMARK OFFICE
CERTIFICATE OF CORRECTION

PATENT NO.    : 6,295,965 B1
DATED         : October 2, 2001
INVENTOR(S)   : Joseph C. Firey It is certified that error appears in the above-identified patent and that said Letters Patent is hereby corrected as shown below:

<u>Title page,</u>
Before item [21], add
-- This patent is subject to a terminal disclaimer. --
Item [45], insert -- * --.

Signed and Sealed this

Seventh Day of January, 2003

JAMES E. ROGAN
*Director of the United States Patent and Trademark Office*